United States Patent
Henry et al.

(10) Patent No.: US 8,792,121 B2
(45) Date of Patent: Jul. 29, 2014

(54) METHOD FOR CONTROLLING PRINTING OF A PRINT JOB

(75) Inventors: Shaun Henry, Middleton, ID (US);
Fabio Giannetti, Los Gatos, CA (US);
Paul Wissenbach, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 344 days.

(21) Appl. No.: 13/278,147

(22) Filed: Oct. 20, 2011

(65) Prior Publication Data

US 2013/0100483 A1    Apr. 25, 2013

(51) Int. Cl.
*G06F 3/12*    (2006.01)

(52) U.S. Cl.
USPC .......................................... 358/1.15; 358/1.13

(58) Field of Classification Search
None
See application file for complete search history.

(56) References Cited

U.S. PATENT DOCUMENTS

| | | | |
|---|---|---|---|
| 7,298,503 B2 | 11/2007 | Christiansen et al. | |
| 7,385,714 B2 | 6/2008 | Christiansen | |
| 7,509,671 B1 | 3/2009 | Bedell et al. | |
| 2006/0215185 A1 | 9/2006 | Van Den Tillaart | |
| 2010/0026741 A1* | 2/2010 | Gold et al. | 347/7 |
| 2010/0097653 A1 | 4/2010 | Rai et al. | |
| 2010/0278546 A1* | 11/2010 | Korfanta | 399/24 |
| 2011/0235101 A1* | 9/2011 | Misawa | 358/1.15 |
| 2012/0099139 A1* | 4/2012 | Zhou et al. | 358/1.15 |

FOREIGN PATENT DOCUMENTS

| | | |
|---|---|---|
| JP | 2002-091748 | 3/2002 |
| JP | 2006-209508 | 8/2006 |

* cited by examiner

*Primary Examiner* — Fan Zhang

(57) ABSTRACT

A method for controlling printing of a print job involves portioning the print job into a plurality of parts via a partition manager, and converting each part of the print job into respective binary image data parts via a Raster Image Processor (RIP) manager. The method further involves controlling a rate of aggregation of the converted parts via a throttle control manager. The rate of aggregation is controlled by monitoring parameters of a printing system used to perform the printing of the print job, determining that at least one of the monitored parameters reaches or exceeds a predefined threshold, and manipulating the rate of aggregation of the converted parts in response to the determining according to a throttle mode predefined for a particular set of monitored parameters.

17 Claims, 4 Drawing Sheets

METHOD FOR CONTROLLING PRINTING OF A PRINT JOB

BACKGROUND

The present disclosure relates generally to methods for controlling printing of a print job.

Printing presses (e.g., a digital front end (DFE) press) may be used in various printing systems and/or organizations for high volume printing. These printers are often designed to handle large customer workflows such as, e.g., thousands of copies of full-color magazines or brochures. In some instances, the size and/or complexity of the customer print job associated with the workflow, as well as the job submission rate for a given workflow may overwhelm the printing system and consume some or even all of the system's resources. When this occurs, one may have to manually slow down the submission of print jobs to the printing system, or use an automated tool to gate the submission of print jobs to the printing system in order to conserve memory and/or other system resources.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
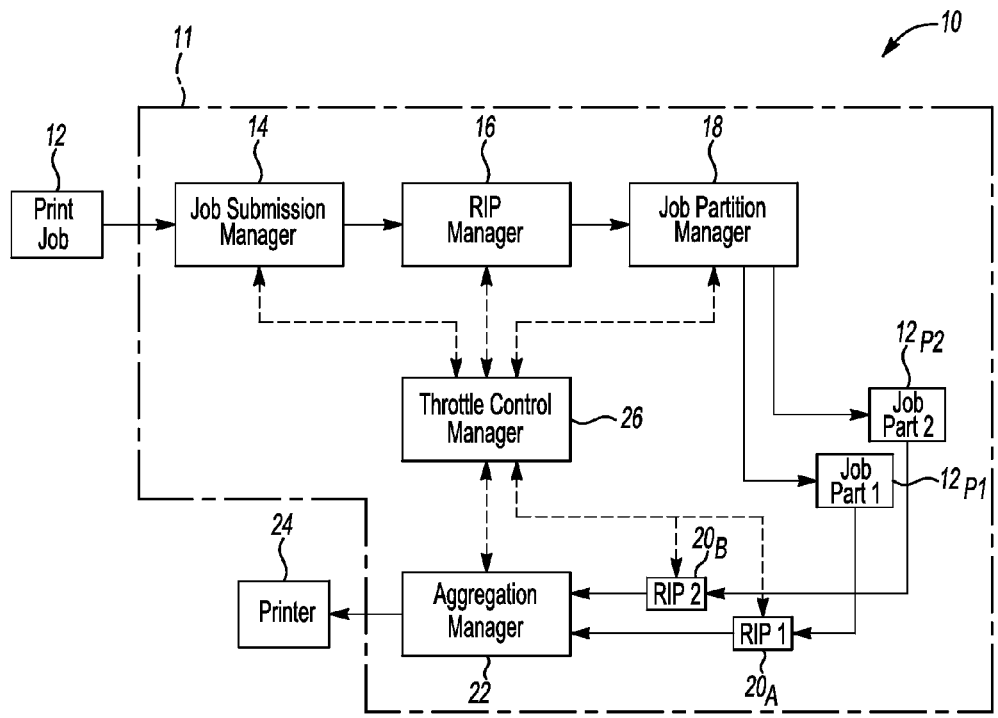
FIG. 1 schematically depicts an example of a system for controlling printing of a print job.

Improvement in the throughput of a high volume of print jobs (e.g., 150 to 600 print jobs per day) through a digital printing press may be accomplished, for example, by dividing each print job into multiple smaller parts, and supplying one or more of these smaller parts to various Raster Image Processor (RIP) engines. In this way, each print job of a customer's workflow is said to be RIPped in parallel. Since multiple RIP engines are being used during printing, it has been found that each RIPped printing job actually flows through the printing system much faster than when the whole print job is supplied to a single RIP engine. Afterwards, the RIPped print job is aggregated, or stitched back together so that a single digital printing press receives and prints a single print job.

Aggregation of the multiple parts of the print job may, in some instances, use a significant amount of system resources including Random Access Memory (RAM), hard disk space, and network bandwidth. In some cases, the amount of resources consumed during aggregation is such that the printing system may run out of those resources (e.g., RAM or hard disk space) and/or overwhelm the network. This situation may occur, for example, when several large volume workflows are partitioned (i.e., RIPped) in parallel and then aggregated before printing. When the printing system runs out of resources and/or the network is overwhelmed, the printing system may operate at a slower rate. Slower operation rates may starve the printing press of page data, potentially resulting in failed execution of print jobs because the printing press is not receiving the job pages at a print speed necessary for continuous printing by the press. In some cases, the printing system may crash when a certain amount of resources are consumed and/or when the network is severely overwhelmed.

Example(s) of the method as disclosed herein may be used to control printing of a print job by manipulating a rate of aggregation of partitioned print jobs until the printing system or organization has enough resources available for efficient and effective printing. As an example, efficient and effective printing may include the ability to RIP and print no slower than at a rated engine speed. For a high complexity print job, efficient and effective printing may include manipulating the rate of aggregation to achieve the highest possible rate of printing without starving the rest of the system of resources. The method disclosed herein uses real time data, such as a then-current amount of available RAM, a then-current amount of available hard disk space, and a network capacity that is then-currently being consumed by the whole printing system to control the aggregation rate. In some instances, the data may also be used along with heuristic information to determine when aggregation of RIPped print jobs should be started, paused, or allowed to complete.

Without being bound to any theory, it is believed that the examples of the method may also be used to prevent printing systems that use digital printing presses from being overloaded due, at least in part, to customers handling a high number of print jobs. When this occurs, a significant amount, if not all of the system resources may be consumed during printing, which may, in effect, reduce the overall throughput of print jobs. In an example, the printing system may be protected from being overloaded by prioritizing the usage of critical system resources based, at least in part, on a print job priority and a digital printing press priority. As such, the method of the instant disclosure provides, in part, for a print job processing pipeline that is reliable, stable, and enables maximized printing throughput even under heavily-loaded printing conditions (e.g., a high volume of print jobs).

Referring now to FIG. 1, an example of a printing system (identified by reference numeral 10) is depicted that may be used to perform examples of the method disclosed herein. The printing system 10 may be any system, scheme, or configuration including one or more printing devices or presses 24 for printing one or more print jobs 12. The printing system 10 depicted in FIG. 1 includes a single printing device 24, while other printing systems may include two, three, or more printing devices 24. For instance, in the example shown in FIG. 5 (which will be described in further detail below), another example of the printing system 10' includes four printing devices $24_A$, $24_B$, $24_C$, and $24_D$. Further, the printing device 24 of the printing system 10 may be chosen from any digital printer, web-fed printing press, sheet-fed printing press, packaging printers, labeling printers, clustered office printers, and/or offset printers capable of handling large customer workflows (which may include a large number of print jobs). In an example, the printing device is chosen from DFE presses such as those from the HP® Indigo 5500 Digital Press series or the HP® Indigo 7000 Digital Press series (both series being available from Hewlett-Packard Co., Palo Alto, Calif.).

The printing system 10 further includes a control system 11 associated with the printing device 24. The control system 11 may be embodied as one or several electronic processing devices, such as computer(s) that work in conjunction with a respective central processing unit (CPU) that performs the function of general-purpose computer(s). The control system 11 may otherwise be embodied as one or more application specific integrated circuit (ASIC), and is/are customized for the particular use or purpose of controlling the printing of print jobs submitted for printing. In either configuration, the control system 11 processor(s) and/or ASIC(s) may include software programs having computer readable code encoded on a non-transitory, tangible computer readable medium for performing various functions of the printing system 10, particularly for controlling printing of print jobs submitted to the printing system 10.

As shown in FIG. 1, the control system 11 includes, in part, a job submission manager 14, a RIP manager 16, a job partition manager 18, an aggregation manager 22, and a throttle control manager 26. Each of these managers 14, 16, 18, 22, and 26 may be embodied as one or more software programs executable by the control system 11 computer(s) for managing print job submission, print job partitioning, print job RIPping, print job aggregation, and print job manipulation (e.g., print job throttling), respectively. In another example, one or more of the managers 14, 16, 18, 22, and 26 is a software program executable by its own computer. Each of these managers 14, 16, 18, 22, and 26 is referred to herein as components of the control system 11, and details of each of the managers 14, 16, 18, 22, and 26 will be described below. It is to be understood that the managers 14, 16, 18, 22, and 26 are software programs that can reside on one or more computers, and that can be placed on the one or more computers in a variety of combinations such that overall system 10 performance is maximized.

The print job submission manager 14 is responsible for receiving print jobs (such as the print job 12 shown in FIG. 1) from one or more source computers or computing devices. The source computer may be any computing system or processor that may be used, e.g., by a user to initiate a print command. In instances where the printing system 10 is used in an organization where the source computer is part of a network of computers, the source computer may be a desktop computer, a laptop computer, an operator workstation (where several workstations may be run by a single processor, or each may have its own internal processor), and/or the like that is/are connected to the printing system 10 via a wired communication network, such as through a server (not shown). It is to be understood that the source computer may be a virtual machine operating in a host computer. In instances where the printing system 10 is located remotely from the source computer (e.g., the printing system 10 may be its own organization), the source computer may be a desktop computer or a mobile computing device such as a laptop computer, a notebook computer, a tablet computer, and/or the like that is/are connected to the printing system 10 wirelessly, such as via a Cloud. For wireless submission of the print job 12, the source computer may include a wireless modem containing its own software program(s) executing within the source computer.

The print job submission manager 14 may include software code for accepting print job(s), and placing the job contents/assets into the system 10 so that system resources (such as RIPS) may act upon those assets while processing the job into print ready data.

In an example, the print job submission manager 14 may receive one, two, three, or more print jobs from one or more of the source computers/computing devices. The print command used to initiate printing of the print job(s) may contain a command for printing one copy of the print job, or a command to print several copies of the print job. For high customer workflows, the job submission manager 14 may receive one or more print jobs, each requiring hundreds or possibly thousands of copies of each print job. Where several print jobs are submitted, the print job submission manager 14 may include software code for determining an initial, default priority of the print jobs, e.g., where the print jobs are positioned along a pipeline of jobs based on the time the individual print jobs are submitted. For example, if first, second, and third print jobs were submitted at 10:00 am, 10:01 am, and 10:02 am, respectively, the job submission manager 14 may organize the print jobs so that printing of the first print job has priority over second and third print jobs, and printing of the second print job has priority over the third print job, all based on the time that the print jobs were submitted. In another example, print jobs originating from a particular source computer may be given priority over print jobs from another source computer. Print job priority may also be organized according to a user-configurable default priority scheme, such as a scheme based on job type (PDF, XPS, PS, JPG, TIF, etc.), job size, number of color separations in the job, page size of the job, a deadline associated with the job, or any other job characteristic. In any of the examples disclosed herein, the print job priority may be set manually by the user, or automatically by an upstream controller (e.g., a JDF controller). The print job submission manager 14 may also place the job(s) into a processing queue with the proper priority and routing information. The routing information describes which press a job will be printed on in a multi-press environment.

The RIP manager 16 is a component of the printing system 10 that receives the print job 12 from the job submission manager 14. It is noted that, at this point, the print job 12 contains some type of digital data language, such as a concatenative programming language (e.g., PostScript or PS), an open standard document language (e.g., Portable Document Format or PDF), an open specification for page description language (e.g., Open XML Paper Specification or XPS), image formats (e.g., JPG, PNG, TIFF, Multi-Page TIFF, etc.), variable data formats (e.g., PPML, PDF/VT, Personalized JLYT, etc.), or the like. The RIP manager 16 determines a number of pages included in the print job 12, and based on this determination, further determines how the print job 12 should be partitioned (e.g., the number of parts into which the print job 12 is divided for submitting to the RIP engines, e.g., $20_A$ and $20_B$ of a particular pipeline).

As used herein, a "partition" or "part" with reference to a print job 12 refers to a subset of a total number of pages of the print job. Once the number of partitions has been determined, the RIP manager 16 may record the number in a database (shown by reference numeral 30 in FIG. 3) of the control system 11 that is used to track the status of the print job(s).

The RIP manager 16 also assigns the partitions of the print job 12 (once the print job 12 is actually partitioned by, e.g., the job partition manager 18) to one or more RIP engines that is/are associated with the pipeline for raster image processing. In the example shown in FIG. 1, the print job 12 is first partitioned by the job partition manager 18 into two parts $12_{P1}$ and $12_{P2}$, and these parts $12_{P1}$ and $12_{P2}$ may be sent to separate RIP engines $20_A$ and $20_B$, respectively, assuming that the RIP engines $20_A$ and $20_B$ are then-currently available. In instances where the RIP engines $20_A$ and $20_B$ are not then-currently available (e.g., the engines may then-currently be occupied with another print job that preceded the print job 12), processing of the partitions $12_{P1}$ and $12_{P2}$ via the engines $20_A$ and $20_B$ is queued until the engines $20_A$ and $20_B$ are available to receive the respective partitions $12_{P1}$ and $12_{P2}$.

It is to be understood that the print job partition manager 18 is another component of the printing system 10 that, as previously mentioned, is responsible for receiving the print job from the RIP manager 16, and partitioning the print job 12 into the partitions (e.g., $12_{P1}$ and $12_{P2}$). In one example, partitioning may involve dividing a single document into a plurality of parts, where each part contains a preset number of pages. For example, if the print job contains a command to print a single copy of a document containing one thousand pages, then the job may, e.g., be divided into five parts, where each part contains two hundred pages of that document. As such, partitioning may be based on page ranges. It is to be understood that more complex partitioning may occur. For example, partitioning within a page containing variable data may be by asset type. In other examples, a job may be partitioned based on page content and/or complexity of the page content. In still other examples, a job may be partitioned by color pages versus monochrome pages.

When the RIP manager 16 assigns the partitions $12_{P1}$ and $12_{P2}$ (formed by the job partition manager 18 described above) to the engines $20_A$ and $20_B$, respectively, the RIP manager 16 sends the assignment of the partitions $12_{P1}$ and $12_{P2}$ to the respective engines $20_A$ and $20_B$. This assignment generally identifies a number of pages of the print job 12 that are to be RIPped by that particular engine. Also, when a partition $12_{P1}$, $12_{P2}$ has been assigned to a particular engine, a partition RIP status may be noted in the database 30 of the control system 11.

The RIP engines $20_A$ and $20_B$ receive the partition assignment from the RIP manager 16, and determine if a copy of the print job 12 is already available in a memory of the engine $20_A$, $20_B$. If so, the engine $20_A$, $20_B$ will use the copy of the print job 12 to perform raster image processing on the partition received from the RIP manager 16. If a copy is not available, then the RIP engine $20_A$, $20_B$ requests and receives a copy of the print job 12 from the RIP manager 16. The RIP engines $20_A$, $20_B$ can then perform raster image processing on the respective partitions $12_{P1}$, $12_{P2}$. As such, each RIP engine $20_A$, $20_B$ receives a copy of the print job 12 so that it can process the assigned partitions $12_{P1}$, $12_{P2}$ of the job 12.

The RIP engine $20_A$, $20_B$ includes suitable software code for converting the language of the partition $12_{P1}$, $12_{P2}$ (which may be in PS, PDF, or some other language identified above) into binary image data parts. In an example, the RIP engines $20_A$, $20_B$ produce a raster image, or bitmap of the respective parts (e.g., $12_{P1}$ and $12_{P2}$) of the print job 12 by converting the language of the print job into a high-resolution raster image suitable for printing via the digital printing press/printing device 24. After raster image processing, the partition $12_{P1}$, $12_{P2}$ is said to have been RIPped. After the partition $12_{P1}$, $12_{P2}$ has been RIPped, the respective RIP engine $20_A$, $20_B$ sends a signal to the RIP manager 16 indicating that RIPping of the partitions $12_{P1}$, $12_{P2}$ has been completed. Upon receiving the notification, the RIP manager 16 may then update the database 30 of the control system 11.

In the example of FIG. 1, the print job 12 is partitioned into two parts $12_{P1}$ and $12_{P2}$, and two RIP engines $20_A$ and $20_B$ are available to receive the parts $12_{P1}$ and $12_{P2}$, respectively. It is to be understood that, in some instances, sufficient RIP engine resources may not be then-currently available to receive a partition of a print job. For instance, if the print job has four parts, and three engines are available, three of the four parts may be sent to respective engines, while the fourth part waits. In this case, the fourth part may be RIPped by the first RIP engine that becomes available after RIPping of one of the other three parts is complete. Once the individual parts $12_{P1}$, $12_{P2}$ are converted into raster images by the respective engines $20_A$, $20_B$ (i.e., have been RIPped), an aggregation manager (or aggregator) 22 is used to stitch the print job 12 back together. More specifically, the aggregation manager 22 is a component of the system 10 that includes suitable software code for aggregating the plurality of RIPped parts (e.g., $12_{P1}$ and $12_{P2}$) of the print job 12 into a single part that represents a printable print job 12. This single part is then sent to the printing device 24 for printing.

As previously mentioned, the partitioning of the print job 12 may, in some instances, save at least some of the system resources so that the printing system 10 can handle higher volume workflows without being overwhelmed. It has been found, however, that aggregation of the partitioned print job may use a significant amount of system 10 resources, such as random access memory (RAM) and hard disk space. As such, in the absence of preventive countermeasures as disclosed herein, the system 10 may in some instances get overloaded (and potentially crash) when multiple large volume print jobs are being partitioned and processed in parallel (i.e., at substantially the same time).

In an example, the printing system 10 includes the throttle control manager 26. The throttle control manager 26 is a component of the system 10 that is responsible for monitoring system 10 parameters (e.g., operating system parameters, print system parameters, and/or print job parameters) in order to throttle (i.e., restrict the flow of information passing through the system 10) and to un-throttle (when previously throttled) selected components of the printing system 10 while processing one or more print jobs 12. The throttling of the component(s) of the system 10 is used to manipulate the rate of aggregation of a partitioned print job. As used herein, the term "throttling" means "slowing" from an unrestrained speed of operation. For instance, throttling may be used to decrease the rate of aggregation. It is to be understood that the decreasing of the aggregation rate is determined by the throttle control manager 26 on a case-by-case basis based, at least in part, on a then-current volume of print jobs and the amount of system resources that are then-currently available for printing.

Throttling may, for instance, be used to hold back aggregation of one or more print jobs until system resources become available. In these cases, the throttling may be based on an established priority for printing using real time and, in some instances, heuristic data. In this way, for instance, one print job may be aggregated and printed at a time to prevent using up most, or even all of the system's 10 resources during printing.

Throttling may be implemented in a variety of ways, such as by a system wide throttle, throttling of a subset of the system 10, throttling per print job, or by another predefined throttle mode. In a system wide throttle, the entire system 10 is throttled so that new print jobs are not accepted until the system wide throttle is released. In throttling of a subset of the system 10, selected components of the system 10 (such as, e.g., the job partitioning manager 16 and the RIP manager 18) are throttled so that print jobs accepted by the system 10 are not partitioned until the throttle is released. In throttling per print job, a selected print job accepted by the system 10 is throttled or held back so that other print jobs can be processed until the throttle is released.

Further, one or more throttling events (i.e., whenever throttling occurs) may take place at any given time during processing/printing of a print job 12. In an example, the throttle control manager 26 includes computer readable software code for performing the controlling of the printing of the print job 12, such as by throttling one or more components of the printing system 10, print jobs 12, etc.

It is to be understood that the throttle control manager 26 is capable of communicating with any of the system 10 components, including the job submission manager 14, the job partition manager 16, the RIP manager 18 and RIP engines $20_A$ and $20_B$, and the aggregation manager 22. This is shown, e.g., by the double-headed arrows in FIG. 1. In instances where the throttle control manager 26 is embodied as a software program executable by a computer containing software programs representing each of the other system 10 components identified above, communication between the throttle control manager 26 and the other components 14, 16, 18, $20_A$, $20_B$, and 22 is accomplished internally to the computer. However, in instances where the throttle control manager 26 is embodied as its own processor or computer, the throttle control manager 26 may communicate with the other system 10 components 14, 16, 18, $20_A$, $20_B$, and 22 via i) a wired communication network where all of the components are connected to a server, or ii) wirelessly, e.g., via a Cloud. It is to be understood that any communication protocol may be used that is supported by the hardware, operating system, and software of the communicating components.

In an example, the computer upon which the throttle control manager 26 resides also includes communications equipment (not shown) that is capable of establishing at least data connections with remote devices and/or facilities. Generally, the computer includes appropriate communications hardware to support the functional and performance requirements of the system 10. Examples of the communications equipment may include a modem, TCP/IP supporting equipment, a wireless communication chipset, or the like. As will be described further below in conjunction with FIG. 4, the communications equipment may be used so that the throttle control manager 26 can establish appropriate connections with, e.g., the Internet, portable or stationary devices, computers connected to network associated with the printing system 10, or the like, and send notification messages to those devices, etc. These notification messages may be sent whenever a throttle-related event occurs during the examples of the method for controlling printing described in detail below.

Figure 2:
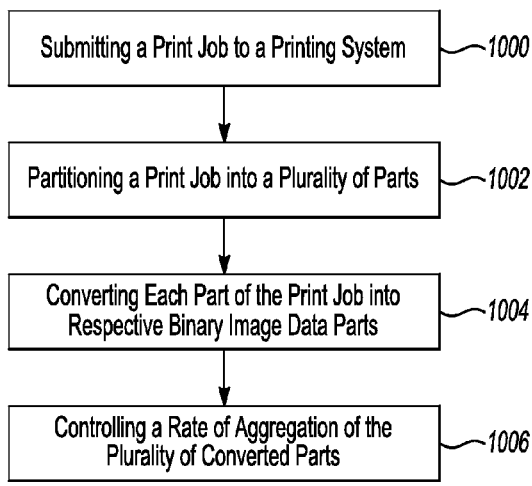
FIG. 2 is a flow diagram depicting an example of a method for controlling printing of a print job.

An example of the method for controlling printing of a print job is generally shown in FIG. 2, and this example will now be described in conjunction with the system 10 described above in conjunction with FIG. 1. The method involves submitting the print job 12 to the printing system 10, as shown at 1000 in FIG. 2. The print job 12 is submitted to the printing system 10 from the source computer, examples of which were identified above. For instance, the user of the source computer may submit a command to the source computer to print the print job 12. The command may be submitted, for example, by selecting a print command on a graphical user interface (GUI), or by executing a program including a print command. Upon submission of the print command, the source computer sends a signal to the job submission manager 14 of the printing system 10. The submission manager 14 may, e.g., be a software program executable by a standalone computer or integrated into a printing system computer that executes software programs representing one or more other components (e.g., 16, 18, etc.) of the printing system 10.

When the print job 12 is submitted, the print job 12 is partitioned, as shown by reference numeral 1002 in FIG. 2. Partitioning is accomplished on command by the RIP manager 16, but the partitioning itself is performed by the job partition manager 18. In the example shown in FIG. 1, the print job 12 is divided or partitioned into two parts; part $12_{P1}$ and part $12_{P2}$. Partitioning may be accomplished, for example, according to a set of rules that the job partition manager 18 refers to during partitioning. These rules may be pre-programmed into the computer executing the software code of the job partition manger 18, and may be adjustable by an operator of the system 10 via re-programming or by over-riding the rules. This may be accomplished, for example, utilizing a user interface associated with the job partition manager 18. In an example, the rules may be applied for real time data pertaining to the current workflow passing through the job partition manager 18 during partitioning.

After partitioning, the partitions (e.g., $12_{P1}$ and $12_{P2}$) are then sent to the RIP engines $20_A$ and $20_B$, for converting the partitions into respective binary image data parts, as shown by reference numeral 1004 in FIG. 2. In other words, the partitions are sent to the engines $20_A$ and $20_B$ for RIPping.

After RIPping, the converted partitions $12_{P1}$ and $12_{P2}$ may be aggregated or stitched together prior to printing via the printing device 24. However, the method as disclosed herein controls a rate of aggregation of the converted partitions $12_{P1}$ and $12_{P2}$ of the print job 12. This is shown by reference numeral 1006 in FIG. 2. By controlling the rate of aggregation, it is believed that executing print jobs at a high throughput may be accomplished, for example, without consuming all of the resources of the system 10. It is further believed that examples of the disclosed method renders examples of the system 10 that are robust to high volume customer workflows.

An example of a method for controlling the rate of aggregation of the plurality of parts of a print job will be described below in conjunction with FIG. 3. It is to be understood that the various steps of the method for controlling the rate of aggregation are performed by the computer upon which the throttle control manager 26 resides, and are performed according to one or more software programs of the throttle control manager 26.

The controlling of the rate of aggregation includes monitoring parameters of the printing system (such as the system 10) being used to perform the printing of the print job 12. The monitoring of the printing system parameters may be accomplished periodically, such as every 30 seconds, every minute, every 5 minutes, or by any preset temporal value. Periodic monitoring may also be accomplished per print job, such as each time a new print job 12 is submitted to the printing system 10 for printing. In another example, the printing system 10 parameters are monitored in response to a trigger, such as system events. Examples of system events include a job 12 entering the system 10, a job 12 entering or exiting a given component or processing stage, a user interacting with the system 10, a real-time throttling notification which triggers other monitoring actions, or other system events.

Figure 3:
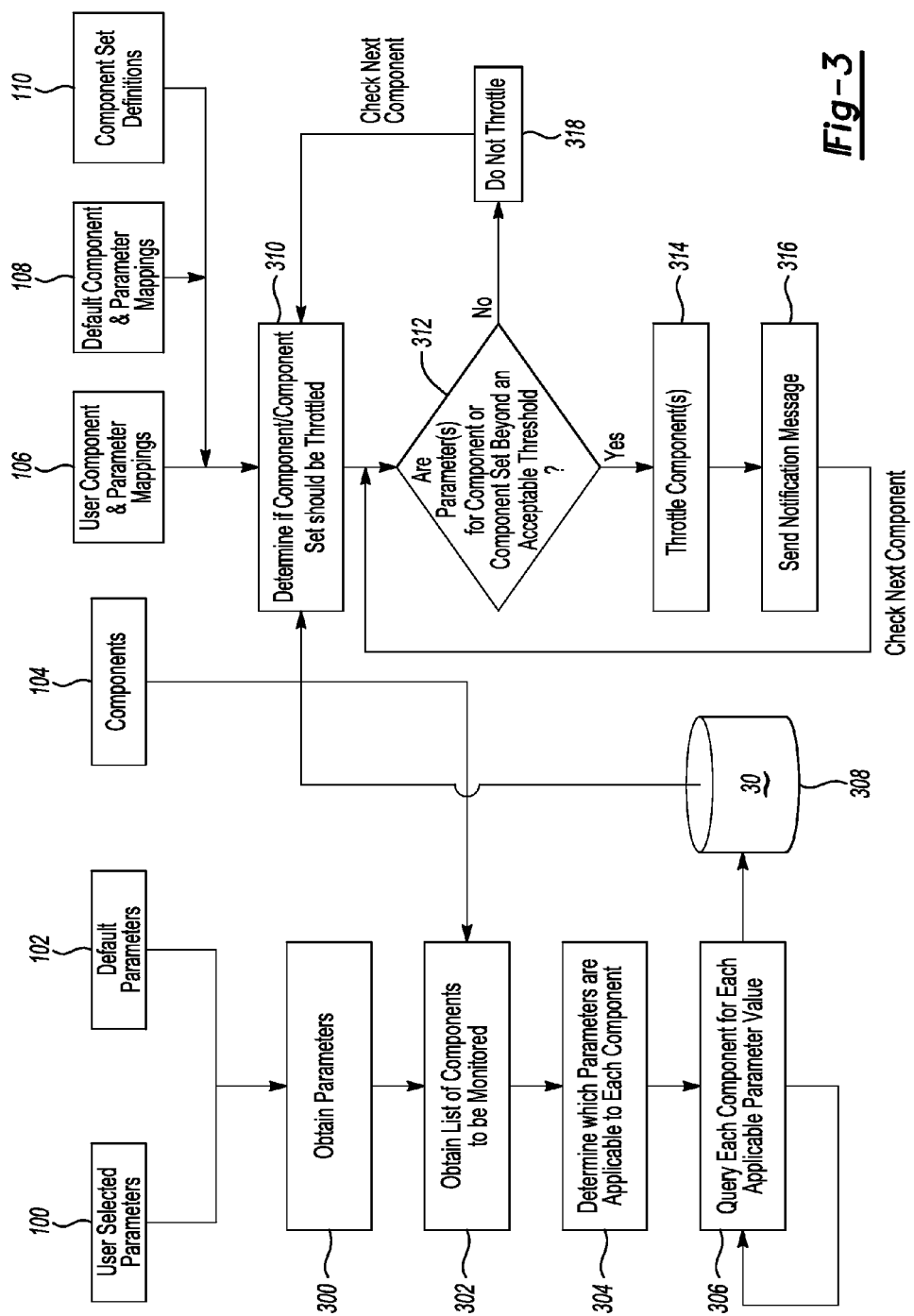
FIG. 3 is a logic flow diagram depicting an example of a method for controlling a rate of aggregation during the controlling of the printing of a print job.

In an example, during the monitoring, the throttle control manager 26 obtains parameters from various components/parts of the printing system 10, as shown by 300 in FIG. 3. The parameters may be obtained, for instance, upon request by the throttle control manager 26 from one or more components of the control system 11 (e.g., 14, 16, 18, etc.) and/or one or more components of other parts of the printing system 10. Examples of parameters from the other parts of the printing system 10 may include parameters pertaining to the system's 10 operating system, (such as a maximum memory, a then-current memory, an available memory, etc.), and parameters pertaining to the printing system/hardware (such as available hard disk space, available network input/output (I/O) bandwidth, available central processing unit (CPU) bandwidth, etc.). Other examples of parameters that may also be obtained include parameters pertaining to the print job itself, such as a number of print jobs in aggregation, the size of the print jobs in aggregation, a number and size of partitions of each print job, the size of new print jobs to be aggregated, etc. In the example depicted in FIG. 5, the parameters identified above are referred to default parameters 102, and the number of parameters may range from one to as many as desired in a single printing system 10. It is to be understood that there are a plurality of parameters that may be monitored, and the examples disclosed herein allow a user to add custom parameters (discussed further hereinbelow) and map the custom parameters to relevant components or job processing steps.

It is further to be understood that each of the default parameters 102 include predefined threshold values, and these values may be used, by the throttle control manager 26, to determine if a then-current reading of a parameter 102 (which is obtained by the throttle control manager 26) may affect the printing system 10. For example, if a reading received from one of the parameters 102 indicates that the network bandwidth has fallen below 20% of the threshold value, then the throttle control manager 26 may conclude that one or more of the RIP engines may have less CPU bandwidth for use during RIPping of a print job. This may, in effect, slow down RIPping of subsequent print jobs, and may further affect aggregation downstream from the RIP engine(s).

Other parameters that may be obtained and monitored by the throttle control manager 26 include user-selected, customized parameters 100. These parameters 100 are selected by a user (using, e.g., his/her personal computer, workstation, or the like), and may be used for a particular workflow. For instance, the user may select to control aggregation by, e.g., throttling the aggregator 22 so that aggregation of the print job submitted by the user is performed based on a number of pages in a partition or on the size of the partition. The user may customize this parameter, e.g., by selecting or entering a number into his/her personal computer or the like that represents an amount that the aggregator 22 is to be throttled.

Parameters may have threshold values or rules associated therewith. Customized parameters 100 may have customized thresholds, which may be determined, for example, in the field by technician(s) or user(s) who are familiar with the specific workflow, jobs and system configuration of a specific product installation. In an example, a user who has knowledge of the specific system and workflow can enter a threshold which he/she believes, based upon intuition or upon objective performance data, will aid the throttle control manager 26 in maintaining a high performance system for the user's particular workflow.

At step 302 in FIG. 3, the throttle control manager 26 obtains a list of components 104 to be monitored. In an example, there may be a default list of components 104 defined in the product by the manufacturer, which includes any components 104 that the manufacturer suggests monitoring. The default list may be altered by the user, which allows the user to configure his/her throttling approach based on his/her own workflow and job throughput volume. The user-defined list may identify that some, but not all, of the components 104 will be monitored, or it may identify that all of the components 104 will be monitored. It is generally desirable to monitor components 104 that may have some effect on the job throughput (e.g., those components 104 that have the potential to be bottlenecks). Examples of components to be monitored include the various components of the control system 11 (e.g., the RIP manager 16, the aggregator 22, etc.), as well as other components of the printing system 10 (e.g., hard disk, CPU, network, RAM, operating system, etc.). The components 104 may be monitored by active pinging driven from the throttle control manager 26, or the components 104 may be monitored via passive event reception where status events are generated by the various components in the system 10.

Then, at step 304, the throttle control manager 26 (via suitable software programs/routines) determines which of the parameters 100, 102 are applicable to, or correspond with which of the components 104 contained in the list. This process is referred to herein as component-parameter mapping. Then, upon making the determination at step 304, the throttle control manager 26 queries each of the components 104 for a parameter value, at step 306. This process repeats itself until all component-parameter mapping is understood by the manager 26. In other words, the throttle control manager 26 reads the component-parameter mapping and makes the persisted mapping (as stored in a file, database, etc.) into an operational/executable mapping where the throttle control manager 26 knows which parameters 100, 102 to query for each component 104. As such, the component-parameter mapping describes which parameters 100, 102 the throttle control manager 26 should monitor for a given component 104.

In an example, the component-parameter mapping occurs at throttle control manager 26 boot time. As such, this process may be an instantiation time process. In this example, this process sets up the throttle control manager 26 to be able to manage the system 10.

During component-parameter mapping, it may be assumed that all of the parameters 100, 102 represent a state of the system 10 at a given time. It may also or alternatively be assumed that a state of a sub-set of the system 10 or of a given system component 104 is represented by the parameters 100, 102 of the system, sub-set or component at any given point in time.

All of the information/data (e.g., parameters, parameter values, etc.) obtained at steps 300 through 304 is stored in the database 30 of the control system 11, as shown by reference numeral 308 in FIG. 3. Thereafter, the throttle control manager 26 determines (via suitable software programs/routines) if the operation of one or more components of the printing system 10 should be manipulated so that the rate of aggregation of the print job 12 may be controlled. In an example, the operation of the component(s) may be manipulated by determining, via the throttle control manager 26, if the component(s) should be throttled. In the example described herein in conjunction with FIG. 3, each component 104 or set of components 110 (i.e., a previously defined grouping of components, such as all of the components of the control system 11) is individually assessed, by the throttle control manager 26, to determine if that component 104 or set of components 110 should be throttled at step 310. The sets of components 110 may be defined by the manufacturer or by the user. In an example, the sets of components 110 are loaded from a persistent data source (file, database, etc.) during the instantiation of the throttle control manager 26. The throttle control manager 26 executes suitable software programs for i) determining if the component 104/set of components 110 require throttling (i.e., step 312), ii) throttling the component 104/set of component(s) 110 (i.e., step 314), and iii) sending a notification message to the user (i.e., step 316).

It is to be understood that each iteration of the software program (i.e., the determining, throttling, and sending) is performed for the single component 104 or set of components 110, and execution of the software program is repeated for a different component 104 or set of components 110. It is further to be understood that the execution of the software program may be repeated as many times as necessary so that the method may be applied for each component 104 or set of components 110 of the printing system 10.

The determination of whether or not a component 104 or set of components 110 should be throttled may be based, at least one part, on information stored in the database 30 from the component-parameter mapping, which includes the component-user-selected parameter mapping information 106 and the component-default parameter mapping information 108.

The throttle control manager 26 determines if a component 104 or a set of components 110 should be throttled if a monitored parameter of a given component 104 or set of components 110 exceeds the threshold value for that particular component 104 or set of components 110. For example, if the CPU bandwidth availability threshold for a RIP machine states that a RIP machine must have 30% CPU available, and RIP machine A only has 20% CPU bandwidth available, then the throttle control manager 26 will effectively throttle jobs from being assigned to RIP machine A so that RIP machine A can finish processing the job(s) it is currently working on in order to bring the consumed CPU bandwidth below 70% (therefore not exceeding the 30% available CPU threshold). Another action that could be taken in this example includes pausing a job that RIP machine A is working on (if and only if RIP machine A is working on 2 or more jobs in parallel) so that the available CPU bandwidth is brought back to ≥30%.

It is to be understood that the throttle control manager 26 may determine that one, some, or all of the components of the printing system 10 should be throttled (from several iterations of the software program executing steps 312, 314 and 316), and this determination may be based on real time data collected during monitoring. In some instances, the determination may also be made utilizing heuristic data in addition to the real time data. The heuristic data may include data previously obtained from other printing jobs that have already passed through the printing system 10, and such information is previously stored in the database 30. For example, while making a determination at step 310 that one or more components of the system 10 should be throttled during printing of a particular print job that has 10,000 pages, the throttle control manager 26 may use real time data including the information stored in the database 30 at step 308, as well as heuristic data also stored in the database 30.

The heuristic data may have been obtained for another print job that also contained 10,000 pages, another print job that was previously printed for the same client, and/or the like. If, for instance, the heuristic data shows that certain printing system 10 components were throttled during printing of another print job (such as, e.g., another print job that also contained 10,000 pages), and the throttle control manager 26 finds that the current print job 12 is similar to the other print job from which the heuristic data was obtained, then the throttle control manager 26 may determine that throttling of system 10 component(s) should occur for efficient and effective printing of the then-current print job that is similar to the previously-printed print job. The use of heuristic data for throttling is proactive and preventative, rather than reactive.

In instances where the throttle control manager 26 determines that throttling is unnecessary, the method ends and printing of the print job 12 is performed without any manipulation of the rate of aggregation of the print job 12 that is then-currently passing through the printing system 10.

In an example, the throttle control manager 26 determines that throttling should take place, e.g., at step 310. The throttle control manager 26 then determines if one of the monitored parameters (e.g., as determined from steps 300 through 306) has a corresponding parameter value that exceeds an acceptable threshold value. If not, then throttling of a component of the printing system 10 is unnecessary, and as such, throttling does not occur. This is shown at step 318. If one or more of the parameter values exceed a threshold, then the method moves to step 314, where throttling of a component of the system 10 takes place.

The threshold value of each of the parameters 100, 102 may, for example, be established as a default value by the manufacturer of the system 10, by personnel associated with the organization including the printing system 10, or by some other authorized entity. Once set, the threshold value will remain the same until the threshold value is changed by the authorized entity. In another example, the threshold value may be set based on the heuristic data described above. For instance, if the heuristic data shows that printing was deleteriously affected when a certain parameter value (e.g., amount of available RAM) fell below a certain value (e.g., below 30% of a total available memory), then the threshold value may be established based on the heuristic data (e.g., the threshold value may be 30% of the total RAM). In some instances, the threshold value may be set by a user, such as the person submitting the print job 12. In these instances, the user may select the threshold values from a list of menu choices presented on his/her computer or some other user interface. It is to be understood that, when the user selects the threshold values, the user-selected thresholds may be automatically reset back to default settings as soon as the user's print job 12 has been printed.

The throttle control manager 26 determines that a parameter 100, 102 value exceeds the threshold at step 312 by comparing the two values using an appropriate software program. For instance, the threshold values corresponding to each component of the system 10 may be included in a look up table, which is also stored in the database 30. The throttle control manager 26 may refer to the look up table when making the comparison with the parameter 100, 102 value of the component obtained for the then-current print job 12.

When the throttle control manager 26 determines that throttling is necessary at step 312, the method further includes manipulating the rate of aggregation of the parts of the print job 12. In one example, the rate of aggregation may be manipulated by throttling the component which has parameter values that exceed the threshold values during step 312.

As previously mentioned, the term "throttle" or "throttling" refers to the restricting of the flow of information/data through the printing system 10. Throttling may involve pausing any then-current operation pertaining to the printing of the print job 12. For example, if the component is the aggregation manager 22, then the aggregation manager 22 may be throttled (on command by the throttle control manager 26) by pausing any then-current aggregation of the parts $12_{P1}$, $12_{P2}$ until, e.g., enough system resources become available so that aggregation may be resumed (i.e., by un-throttling the aggregation manager 22) when enough resources become available). Throttling may occur, for example, when parameter values of component(s) 104 or set(s) of components 110 exceed the threshold values.

The throttle control manager 26 may determine when enough resources become available by further monitoring the parameters associated with the component (e.g., the aggregation manager 22, in the instant example) and/or with another component of the system 10 to determine when resources become available as the operation(s) of the other components are completed for the instant print job 12, or for a print job preceding the instant print job 12.

In some instances, the operation(s) of the component may be stopped (e.g., the aggregation of the part $12_{P1}$, $12_{P2}$ may be paused). When this occurs, the operation(s) of the stopped component(s) may be resumed (un-paused) for the instant print job 12 even when system 10 resources become available. In these instances, the print job 12 does not have to be resubmitted after system 10 resources become available so that the print job 12 can pass through the system 10 effectively and efficiently.

In yet another example, throttling may be accomplished by continuing the operation(s) of the component (e.g., the aggregation manager 22 in the example above) according to a priority level. The priority level may be established, for instance, by prioritizing resources of the printing system 10. Prioritization of the resources of the printing system 10 may be accomplished via a number of ways depending, at least in part, on any specific needs of the system 10 and/or of the user who submitted the print job 12. In one example, prioritization may be accomplished via a priority list, where all of the system 10 resources (or sets/classes of resources) are included according to a user-selected order of priority. This list may be created, by the user, via his/her computer, a user interface, a web-interface, or the like, and the list may be stored in the database 30. System resource or component prioritization may assign priority to a particular system component. For example, if the RIP manager 16 is assigned as the highest priority sub-system, then the throttle control manager 26 can throttle other components of lower priority to ensure that the RIP manager 16 is processing jobs as efficiently as possible.

In addition to system 10 resources, the user may also select a priority of print jobs, printing devices, and/or operations (performed via, e.g., particular software programs/routines) of the printing system 10. Print job prioritization may assign priority to particular print jobs 12. As an example, the throttle control manager 26 may throttle jobs with a lower priority to ensure that a high priority job is processed efficiently. For example, if ten print jobs are submitted for printing, then the user may select the order of print jobs to be printed. So, for instance, if print job number three is, according to the user, the most important print job of the ten, then the user may select to have the print job three printed first, and then the other nine print jobs afterwards. In this example, the user may select print job number three as a 'High Priority' print job, which may be designated using his/her computer upon submitting the print jobs for printing. The user may also, in an example, select which print jobs of the ten print jobs are fed to which printers of the system 10. This example is particularly useful for printing systems that contain two or more printers, such as the system 10' shown in FIG. 5.

An example of prioritizing the operation(s) of a component of the printing system 10 includes setting, by the user using his/her computer, for example, that a component of the printing system 10 is set to a 'High Priority' level so that the component is given a higher priority upon processing those print jobs that were also given 'High Priority' status. For instance, the user may select a particular set of RIP engines of the printing system 10 as having a High Priority level so that these engines process only those print jobs that are also set to a High Priority level.

Although the examples set forth above include throttling the print job aggregation manager 22, it is to be understood that any one or more of the other components of the printing system 10 (e.g., the RIP engines, the partition manager, etc.) may be throttled. Further, as briefly mentioned above, throttling may be performed according to a designated throttling mode, such as by a system wide throttle, etc. In a system wide throttle, the entire printing system 10 (i.e., all of the components of the control system 11, as well as other components of the system 10 (e.g., the printer 24)) are throttled so that new print jobs cannot be accepted by the printing system 10 until the system wide throttle is released or un-throttled. The system wide throttle may be implemented a number of different ways. For instance, the job submission manager 14 may be throttled, which will automatically affect the processing of the print job 12 through the entire system 10. In other words, the net effect of the throttling of the job submission manager 14 would be that all components of the printing system 10 will also be throttled, even if not directly throttled on command by the throttle control manager 26. It is to be understood that the processing of a then-current print job continues until printing is completed or the print job submission manager 14 is un-throttled.

In another example, a system wide throttle may be accomplished by throttling each component of the printing system 10 on command by the throttle control manager 26. For instance, the throttling of the job submission manager 14 would prevent new print jobs from being submitted into the printing system 10, while the throttling of the print job aggregation manager 22 may hold up aggregation of the print job then-currently being processed by the system 10. In some cases, the throttling of all of the components of the system 10 at the same time may allow each component being throttled to continue to work on the print job then-currently being processed, or those that are in queue, while new print jobs are held back. In effect, each component of the system 10 may be allowed to direct all of its resources to the print job(s) then-currently in the system 10 without wasting resources on new print jobs that could overwhelm the system 10.

In some instances, the throttling of a single component of the printing system 10 (such as the aggregation manager 22 mentioned above) may be considered to be a throttle of a subset of the system 10, yet the net effect of the throttling may be directed to the entire system 10. In some instances, the throttling of a single component may, on the other hand, affect only the component being throttled, or some (i.e., not all) of the components of the printing system 10. This may also be referred to as a throttle of a subset of the printing system 10.

Further, throttling per print job may include throttling one or more components of the printing system 10 while a particular print job 12 passes through the printing system 10. In this case, the throttling of the component(s) may affect a subset of the system 10, or the entire system 10. It is to be understood that when the print job 12 is finished printing, the throttling of all of the components that were throttled is released so that the printing system 10 resumes default operations for the next print job 12.

In the examples disclosed herein, throttling may be implemented as an on/off or with varying rates of dampening in an effort to minimize instability and improve overall system throughput.

Still referring to FIG. 3, once the component(s) has/have been throttled at step 314, the method involves sending a notification message to a registered client at step 316. The notification message provides some information to the user who submitted the print job, or to some other interested party regarding the status of the processing of the print job. For example, the notification message may include information pertaining to throttle-related events, such as a print job being throttled, a specific component of the printing system 10 being throttled, a workflow path being throttled, the entire system 10 being throttled, or the like.

Figure 4:
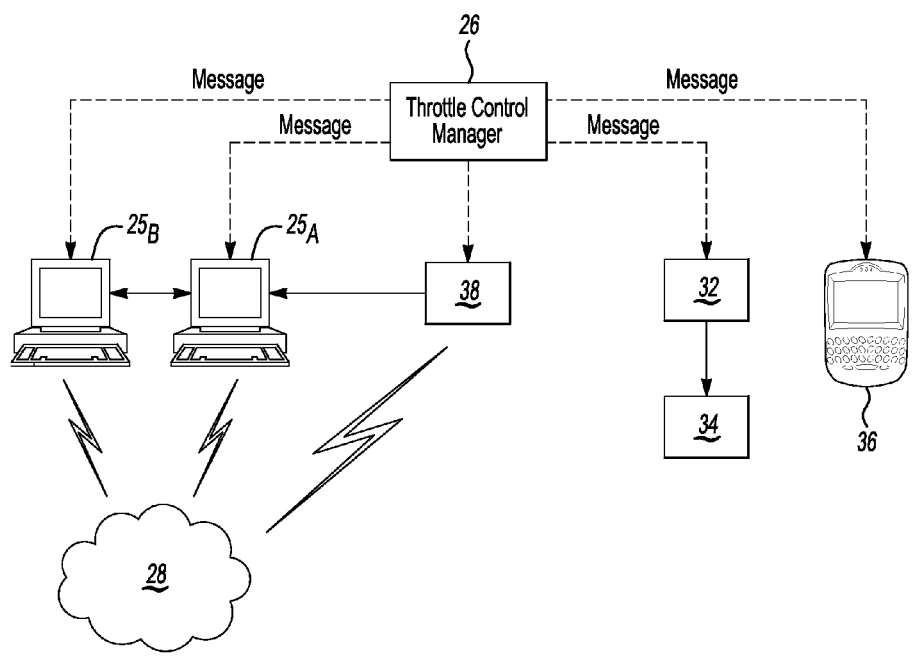
FIG. 4 schematically depicts an example of a system for providing a notification message to a registered client of throttle-related event(s) occurring during the controlling of the printing of a print job.

As shown in FIG. 4, the registered client is any device or system that is registered with the throttle control manager 26. In an example, the client may be registered with the throttle control manager 26 via a web-interface or any other type of user or programmatic interface. For example, a registered client may be the computer from which the print job was submitted (e.g., the user's computer $25_A$). The registered client may include an application that is configured to receive the notification message and display the message as, e.g., a pop-up or dialog box on the display screen of the registered client. The registered client may otherwise be another computer $25_B$ that is operatively connected to a network (e.g., 28 in FIG. 4) to which the user's computer $25_A$ (as well as the throttle control manager 26) is also connected. In this example, the computer $25_B$ may be a central computer operated by personnel of the organization running the printing system 10, a computer of another authorized or interested party, and/or the like.

In yet another example, the registered client may be an electronic mailing (e-mail) account, such as an e-mail account of the user. The message may be formulated, by the throttle control manager 26 via suitable software programs/routines, into an e-mail message format (e.g., a digital message), and the message may then be transmitted to a server 38 (which may be local to, or remote from the printing system 10) via the Internet or a computer network, and then to the registered client.

The registered client may, in another example, be a host server 32 of a remotely accessible page 34 (i.e., a webpage), which may be accessible by the throttle control manager 26 via a suitable carrier and communication system (not shown). The host server 32 includes suitable computer equipment (not shown) upon which information of the remotely accessible page 34 resides/is stored. In this example, an instant message box or pop-up may appear on the display screen of the user's computer $25_A$ indicating that a message is available on the webpage 34.

The registered client may, in yet another example, be an electronic communications device 36 (such as a smart phone 36 shown in FIG. 4) or any other device having communications capabilities and an application thereon that configures the device 36 to receive and display the notification message. It is noted that the communications device 36 may be a portable communications device (such as a smart phone, a laptop computer, a personal digital assistant (PDA), etc.) or a stationary device (such as a landline phone). In an example, the throttle control manager 26 may formulate a text-based message (such as a short message service (SMS) message or text message) or a text- and graphic-based message (such as a multimedia service (MMS) message), and send the message to the user's device 36. In another example, the throttle control manager 26 may formulate a voice-based message, and the throttle control manager 26 may place a voice call to the device 36. The throttle control manager 26 may also be connected to another communications module (e.g., which may be part of the printing system) for transmitting communications. In the examples disclosed herein, a variety of different communications methods may be employed, and the breadth of implementation is not limited to the examples given. Rather, the examples provided merely indicate the broad array of notification methods that could be implemented.

It is to be understood that a throttle-related event notification message may be sent to the registered client for each component 104/set of components 110 that is throttled. So, for instance, if the print job partition manager 18 and the aggregation manager 22 are each throttled, then the registered client will, in one example, receive two separate messages; one for the throttling of the partition manager 18 and another for the throttling of the aggregation manager 22. In another example, a notification message may be sent that indicates that a number of throttling events have occurred.

Once one or more components 104 or sets of components 110 have been throttled (e.g., via the method described above in conjunction with FIG. 3), in an example, the method further includes un-throttling the one or more components 104 or sets of components 110. Un-throttling may be accomplished, for example, upon detecting, via the throttle control manager 26, that enough system resources have opened up so that the printing system 10 can resume its default printing operation (i.e., where no components are throttled). In some instances, un-throttling may be performed per print job, such as upon the completion of printing of a then-current print job. In other instances, un-throttling may be performed during printing of a then-current print job, such as to release the throttle on one or more components 104/sets of components 110 while the print job is actually passing through the printing system 10. In these instances, all of the components 104/sets of components 110 that have been throttled are un-throttled, or less than all (e.g., one or some) of the components 104/sets of components 110 that have been throttled are un-throttled. In the latter case, the throttle control manager 26 may be able to manipulate the rate of aggregation of a then-current print job by manipulating (i.e., throttling and un-throttling) the component(s)/set(s) of components. It is to be understood that throttling and/or un-throttling may occur one or several times throughout printing of a single print job.

As previously described, the throttle control manager 26 may be incorporated into a printing system, such as the printing system 10, and is used to control the rate of aggregation of print jobs passing through the system 10. In another example, the throttle control manager 26 may also be incorporated into a production management system, which may be a printing system including a plurality of printers that can handle printing a plurality of print jobs at the same time.

The printers may, for example, be distributed throughout various departments of the production management system (for example, the production management system may have separate departments for printing letters, business cards, and brochures, where each department has its own printer), and the throttle control manager 26 may be configured with suitable software programs/routines encoded on a computer readable medium for control aggregation of the plurality of print jobs at the same time.

Figure 5:
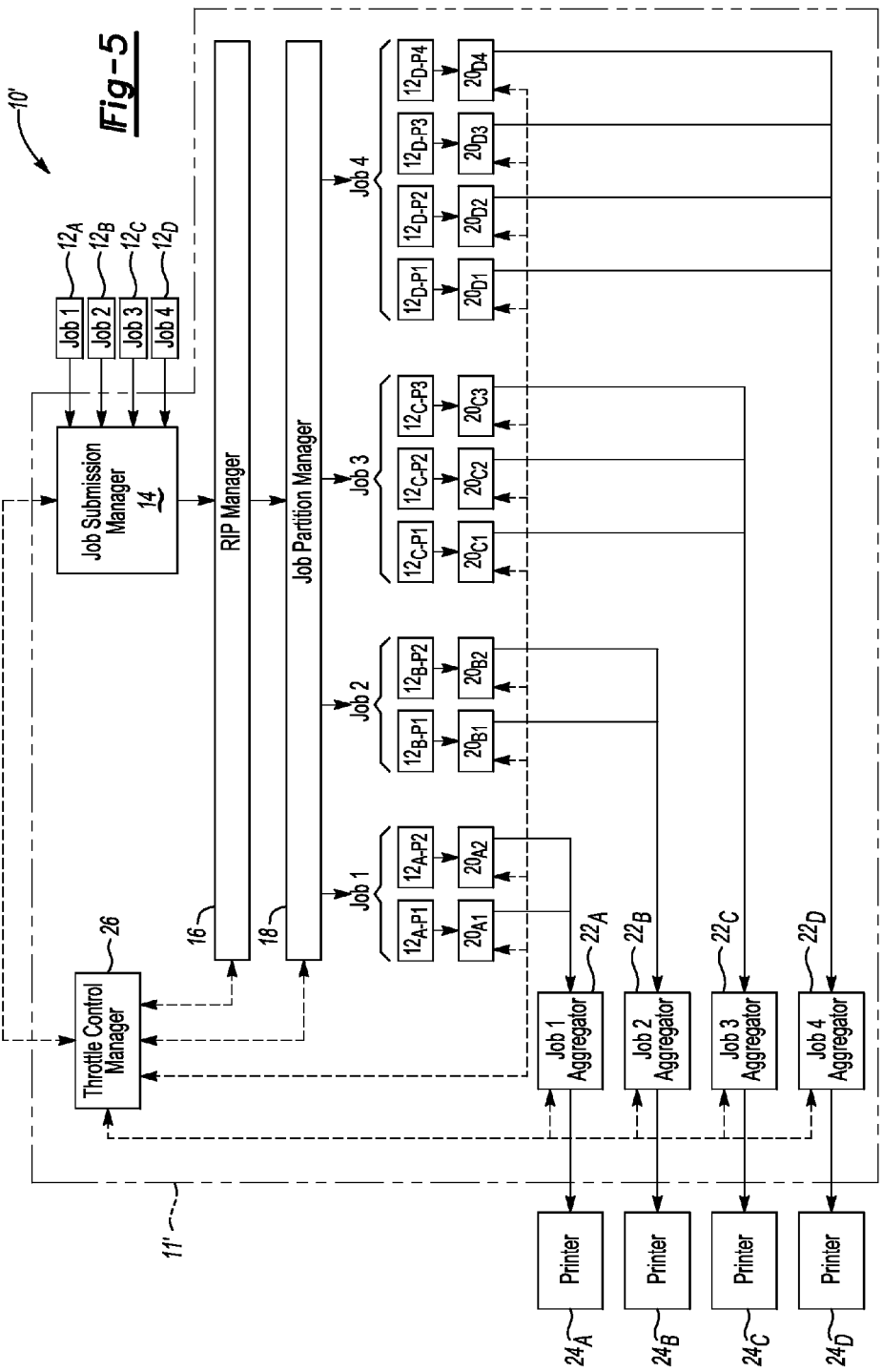
FIG. 5 schematically depicts another example of a system for controlling printing of a plurality of print jobs.

An example of such a printing system 10' is shown in FIG. 5, and this system 10' includes several print jobs $12_A$, $12_B$, $12_C$, and $12_D$ which are all submitted to the control system 11' at the same time from various departments of the system 10'. It is to be understood that the respective operations of the job submission manager 14, the RIP manager 16, and the job partition manager 18 are the same as previously described for FIG. 1. In this example, according to a set of rules, the RIP manager 16 determines that print job $12_A$ should be divided into two parts (parts $12_{A-P1}$ and $12_{A-P2}$), print job $12_B$ should also be divided into two parts (parts $12_{B-P1}$ and $12_{B-P2}$), print job $12_C$ should be divided into three parts (parts $12_{C-P1}$, $12_{C-P2}$, and $12_{C-P3}$), and print job $12_D$ should be divided into four parts (parts $12_{D-P1}$, $12_{D-P2}$, $12_{D-P3}$, and $12_{D-P4}$). After dividing the print jobs $12_A$, $12_B$, $12_C$, and $12_D$ into the appropriate number of parts by the job partition manager 18, each part is fed to a different RIP engine since, in this example, enough RIP engines are available to receive a print job part. As previously mentioned, if there are not enough RIP engines for each of the parts, then one or more of the parts would be placed in a queue until RIP engines become available. In the example shown in FIG. 5, parts $12_{A-P1}$ and $12_{A-P2}$ are fed to RIP engines $20_{A1}$ and $20_{A2}$, respectively; parts $12_{B-P1}$ and $12_{B-P2}$ are fed to RIP engines $20_{B1}$ and $20_{B2}$, respectively; parts $12_{C-P1}$, $12_{C-P2}$, and $12_{C-P3}$ are fed to RIP engines $20_{C1}$, $20_{C2}$, and $20_{C3}$, respectively; and parts $12_{D-P1}$, $12_{D-P2}$, $12_{D-P3}$, and $12_{D-P4}$ are fed to RIP engines $20_{D1}$, $20_{D2}$, $20_{D3}$, and $20_{D4}$, respectively.

After raster image processing of each of the parts by the respective RIP engines, the parts for the print job $12_A$ are fed to a first aggregation manager $22_A$, the parts for the print job $12_B$ are fed to a second aggregation manager $22_B$, the parts for the print job $12_C$ are fed to a third aggregation manager $22_C$, and the parts for the print job $12_D$ are fed to a fourth aggregation manager $22_D$. After aggregation of the print jobs $12_A$, $12_B$, $12_C$, and $12_D$ by the respective aggregation managers $22_A$, $22_B$, $22_C$, and $22_D$, the aggregated print jobs are sent to the printers associated with the departments of the system 10' from which the print jobs were originated. For instance, the print job $12_A$ is printed by the printer $24_A$, the print job $12_B$ is printed by the printer $24_B$, the print job $12_C$ is printed by the printer $24_C$, and the print job $12_D$ is printed by the printer $24_D$.

In the example depicted in FIG. 5, the throttle control manager 26 is in operative and selective communication with each of the components of the printing system 10' (e.g., the job submission manager 14, the RIP manager 16, the job partition manager 18, each of the RIP engines $20_{A1}$, $20_{A2}$, $20_{B1}$, $20_{B2}$, $20_{C1}$, $20_{C2}$, $20_{C3}$, $20_{D1}$, $20_{D2}$, $20_{D3}$, $20_{D4}$, and the aggregation managers $22_A$, $22_B$, $22_C$, $22_D$), and can control the rate of aggregation of the plurality of parts of each of the respective print jobs $12_A$, $12_B$, $12_C$, $12_D$ via the example methods described in conjunction with FIG. 3 above. The throttling (and un-throttling in instances where component(s) 104/set(s) of components 110 are already throttled) may be accomplished according to respective throttle modes, where one of the throttle modes may be the same or different from another throttle mode. For instance, a system wide throttle may be applied for print job $12_A$, but throttling according to the print job may be applied for the other print jobs $12_B$, $12_C$, and $12_D$.

The system 10 may include software programs/routines for establishing a priority of printing of the plurality of print jobs $12_A$, $12_B$, $12_C$, $12_D$. The priority may be based, e.g., on real time data obtained during component-parameter mapping during steps 300 through 306 described above for FIG. 3 and/or on heuristic data previously stored in the database 30. It is to be understood that the component-parameter mapping does not itself contain the real time data, but rather it contains the parameters to be monitored for a component. The component-parameter mapping describes which parameters the throttle control manager 26 should monitor for a given component or set of components. The priority may otherwise be user-selected based, e.g., on the user-selected customized parameters also described above. In some instances, aggregation of the parts of the respective print jobs $12_A$, $12_B$, $12_C$, $12_D$ may also be prioritized, and such priority may be based, at least in part, on controlling of the rate of aggregation of the print jobs $12_A$, $12_B$, $12_C$, $12_D$.

The examples of the system and method may be used for printing system (as described herein), as well as for other processes of an organization. For instance, the examples may be applied for scheduling processes, work cost estimation processes, delivery processes, and/or the like. These systems may be used by the organization, for example, to maximize throughput, minimize costs, and/or to perform other planning or strategic operations of the organization.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

While several examples have been described in detail, it will be apparent to those skilled in the art that the disclosed examples may be modified. Therefore, the foregoing description is to be considered non-limiting.

What is claimed is:

1. A method for controlling printing of a print job, comprising:
   partitioning the print job into a plurality of parts, the partitioning being accomplished via a partition manager including computer readable code encoded on a non-transitory, tangible computer readable medium of a processor;
   converting each part of the print job into respective binary image data parts, the converting being accomplished via a Raster Image Processor (RIP) manager including computer readable code encoded on the computer readable medium of the processor; and
   controlling a rate of aggregation of the plurality of converted binary image data parts via a throttle control manager including computer readable code encoded on the computer readable medium of the processor, the controlling including:
   monitoring parameters of a printing system used to perform the printing of the print job, the parameters being selected from the group consisting of a maximum memory, a then-current memory, an available memory, available hard disk space, available network input/output (I/O) bandwidth, available central processing unit (CPU) bandwidth, and combinations thereof;
   determining that at least one of the monitored parameters reaches or exceeds a predefined threshold; and
   manipulating the rate of aggregation of the plurality of converted binary image data parts in response to the determining according to a throttle mode predefined for a particular set of the monitored parameters.

2. The method as defined in claim 1 wherein the throttling mode is chosen from pausing aggregation, stopping aggregation, and continuing aggregation according to a priority level.

3. The method as defined in claim 1 wherein the manipulating includes throttling a print job aggregator, the print job aggregator including computer readable code encoded on the computer readable medium of the processor for aggregating the plurality of converted binary image data parts into a single part representing the print job.

4. The method as defined in claim 1 wherein the manipulating includes throttling at least one component of the printing system, and wherein upon initiating the throttling, the controlling further comprises prioritizing resources of the printing system.

5. The method as defined in claim 1 wherein the monitoring of the parameters includes:
   obtaining a list of the parameters at a throttle control unit;
   obtaining a list of printing system components to be monitored during controlling of the rate of aggregation of the plurality of converted binary image data parts;
   determining which of the parameters contained in the list is associated with the printing system components contained in the list; and querying the determined printing system components for respective parameter values.

6. The method as defined in claim 5 wherein the monitoring is accomplished periodically or in response to a trigger.

7. The method as defined in claim 5 wherein in response to the querying, the monitoring further includes:
obtaining the parameter values from the respective printing system components; and
mapping the parameter values.

8. The method as defined in claim 1 wherein upon manipulating the rate of aggregation of the plurality of print job parts, the method further comprises sending a notification message to a registered client, the registered client being any of: the printing system from which the print job was initiated; an other printing system operatively connected to a network to which the throttle control manager is also connected; an electronic mailing account; an electronic communications device; or a host server of a remotely accessible page.

9. The method as defined in claim 1 wherein a plurality of other print jobs are partitioned by the partition manager, and wherein the controlling further includes:
manipulating the rate of aggregation of the plurality of other print jobs according to respective throttle modes, wherein one of the throttle modes is the same or different from an other of the throttle modes; and
prioritizing aggregation of the print job and the plurality of other print jobs based on the respective controlling of the rate of aggregation of the print job and the plurality of other print jobs.

10. The method as defined in claim 1 wherein the parameters being monitored are user-defined custom parameters.

11. The method as defined in claim 1 wherein the throttle control manager is incorporated into a production management system, and wherein the method further comprises controlling a rate of aggregation of a plurality of converted binary image data parts of a plurality of other print jobs, and wherein at least one of the plurality of other print jobs is directed to a first printer associated with the printing system and at least one other of the plurality of other print jobs is directed to a second printer associated with the printing system.

12. The method as defined in claim 1 wherein during the monitoring of the parameters, real time data is collected.

13. A printing system, comprising:
a printing device; and
a control system associated with the printing device, the control system including:
a partition manager to partition a print job into a plurality of parts;
a Raster Image Processor (RIP) manager to convert each part of the print job into respective binary image data parts;
an aggregation manager to aggregate the plurality of converted binary image data parts into a single part representing the print job; and
a throttle control manager to throttle at least one component of the control system to manipulate a rate of aggregation of the plurality of converted binary image data parts into the single part until a number of printing system resources is available for printing, the throttle control manager including:
computer readable code for monitoring printing system parameters, the parameters being selected from the group consisting of a maximum memory, a then-current memory, an available memory, available hard disk space, available network input/output (I/O) bandwidth, available central processing unit (CPU) bandwidth, and combinations thereof;
computer readable code for determining that at least one of the monitored printing system parameters reaches or exceeds a predefined threshold; and
computer readable code for initiating manipulating of the rate of aggregation of the plurality of converted binary image data parts in response to the determining, the manipulating being accomplished by throttling at least one of the partition manager, the RIP manager, or the aggregation manager according to a throttle mode predefined for a particular set of the monitored printing system parameters;
wherein each of the computer readable codes are embedded within a non-transitory, tangible computer readable medium.

14. The system as defined in claim 13, further comprising a registered client, the registered client being any of: the printing system from which the print job was initiated; an other printing system operatively connected to a network to which the throttle control manager is also connected; an electronic mailing account; an electronic communications device; or a host server of a remotely accessible page.

15. The system as defined in claim 13, further comprising a production management system within which the throttle control manager is incorporated, the production management system comprising:
a first printer to which at least one of a plurality of print jobs is directed; and
a second printer to which at least one or a plurality of other print jobs is directed.

16. The system as defined in claim 13 wherein during the monitoring of the parameters, real time data is collected.

17. The system as defined in claim 13 wherein the parameters to be monitored are user-defined custom parameters.

* * * * *